Patented Mar. 12, 1946

2,396,555

UNITED STATES PATENT OFFICE 2,396,555

STABILIZED POLYVINYL ACETALS

Fred W. Cox, Cuyahoga Falls, Ohio, assignor to Wingfoot Corporation, Akron, Ohio, a corporation of Delaware No Drawing. Application December 29, 1942, Serial No. 470,481

1 Claim. (Cl. 260—73)

This invention relates to the stabilization of poly-vinyl acetal compositions. The acetals may be obtained by treatment of polyvinyl alcohol with an aldehyde. Partial conversion to the acetal is common. For instance, the common commercial polyvinyl butyral resin contains about 20 per cent of hydroxy and about 2 per cent acetate groups, the balance being polyvinyl butyral. Although the invention applies to other acetals, such as polyvinyl acetal and polyvinyl propional, it will be described more particularly in connection with the stabilization of polyvinyl butyral resin because this is the most common commercially.

The stabilizer of this invention is an hydroxy-quinoline, such as 8-hydroxy-quinoline, 2-hydroxy-lepidine, 2-hydroxy-quinoline, 4-hydroxy-quinoline, 5-hydroxy-quinoline, 6-hydroxy-quinoline, 7-hydroxy-quinoline, 4-hydroxy-quinaldine, 6-hydroxy-quinaldine, 7-hydroxy-quinaldine, 8-hydroxy-quinaldine, 6-hydroxy-lepidine, 7-hydroxy-lepidine, 8-hydroxy-lepidine, 2-hydroxy-4-ethyl-quinoline, etc. Any of these compounds when present in a small amount prevents or inhibits decomposition of the polyvinyl acetal resin when subjected to heat. In the absence of any stabilizer, the polyvinyl acetal resins decompose at elevated temperatures and discolor. The presence of one of the stabilizers of this invention prevents or retards such discoloration.

The stabilizer will usually be used in an amount equal to at least about 0.5 per cent of the polyvinyl acetal resin, and as much as 10 per cent or more may be employed. The stabilizer may be incorporated in the resin in any suitable manner. The use of the stabilizer is illustrated in the following example:

Example

A cement containing 1 part of polyvinyl butyral and 0.02 part of 8-hydroxy-quinoline in 4.6 parts by weight of alcohol was poured into glass molds, and the alcohol was allowed to evaporate. The resulting film and a control film (containing no stabilizer) similarly prepared were placed in an oven at 110° C. At the end of three hours the film containing the hydroxy-quinoline was much less discolored than that to which nothing had been added.

What I claim is:

Polyvinyl butyral resin containing 8-hydroxy-quinoline as a stabilizer.

FRED W. COX.